United States Patent [19]
Subrizi et al.

[11] 3,938,187
[45] Feb. 10, 1976

[54] SYSTEM FOR PUTTING AN INFORMATION RECORD ONTO A MAGNETIC SUBSTRATE

[75] Inventors: Angelo Subrizi; Ettore Violino, both of Ivrea, Italy

[73] Assignee: Ing. C. Olivetti & C., S.p.A., Ivrea, Italy

[22] Filed: July 9, 1974

[21] Appl. No.: 486,873

[30] Foreign Application Priority Data
July 13, 1973 Italy .................... 69104/73

[52] U.S. Cl. ...... 340/172.5; 178/4.1 R; 340/347 DD
[51] Int. Cl.² .................................. G06F 3/06
[58] Field of Search ............ 340/172.5, 347 DD; 178/4.1 R

[56] References Cited
UNITED STATES PATENTS

| | | |
|---|---|---|
| 3,414,894 | 12/1968 | Jacoby .................... 340/347 DD |
| 3,452,348 | 6/1969 | Vallee .................... 340/347 DD |
| 3,618,043 | 11/1971 | Whiting .................... 340/172.5 |
| 3,736,568 | 5/1973 | Snook .................... 340/172.5 |
| 3,757,309 | 9/1973 | Hashizume et al. .................... 340/172.5 |

*Primary Examiner*—Eugene G. Botz
*Attorney, Agent, or Firm*—Schuyler, Birch, Swindler, McKie & Beckett

[57] ABSTRACT

An information recording system comprises a peripheral control unit for recording bits of a character one at a time coincident with the middle of a record time interval. The peripheral control unit is responsive to a central unit which cyclically transmits microinstructions to the peripheral control unit coincidentally with transfer of bits to said record device from a register storing the bits of a character to be recorded.

9 Claims, 5 Drawing Figures

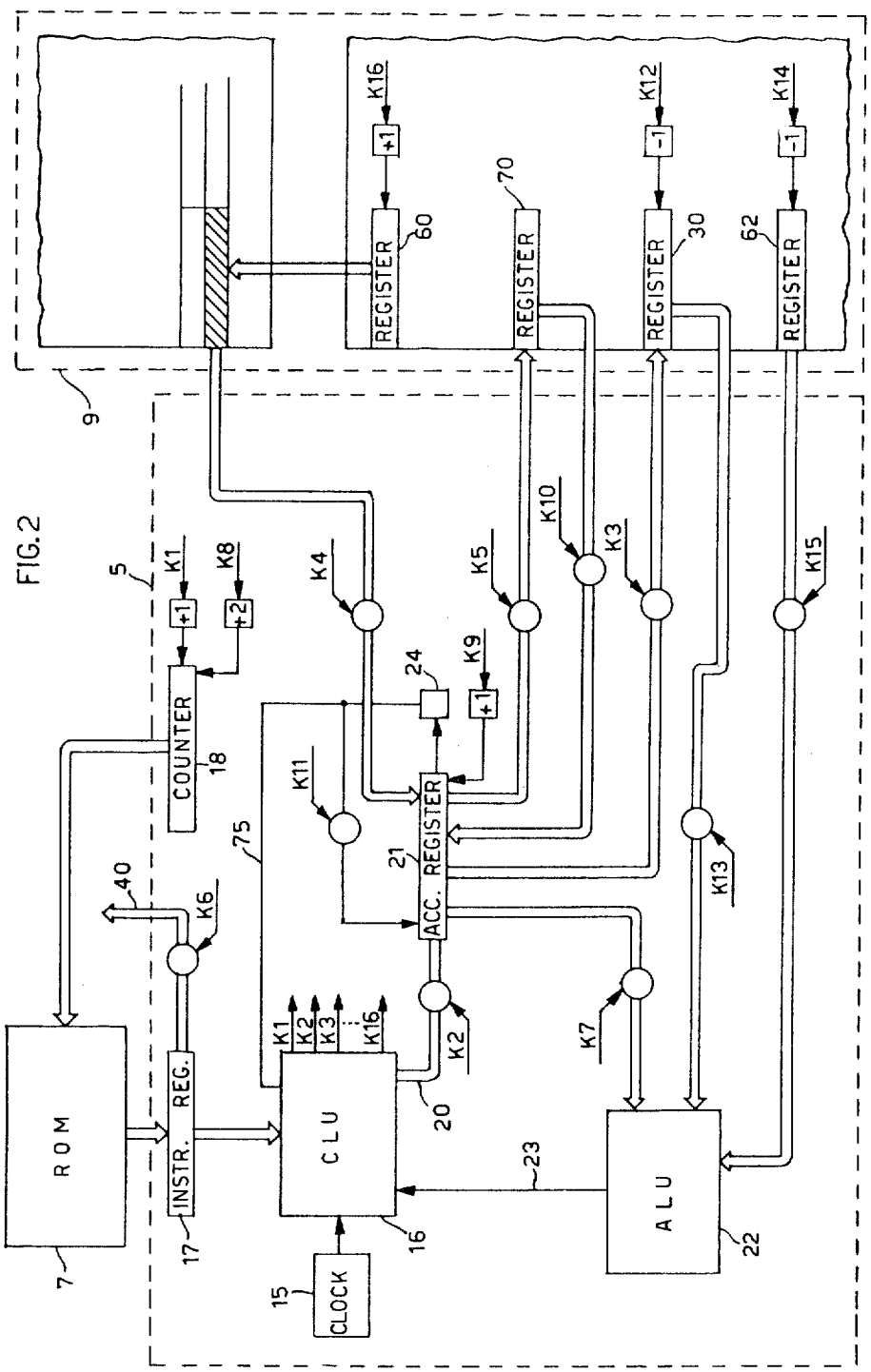

SYSTEM FOR PUTTING AN INFORMATION RECORD ONTO A MAGNETIC SUBSTRATE

BACKGROUND OF THE INVENTION

The present invention refers to a system for recording an information character record onto a magnetic substrate comprising a first memory for storing a microprogram adapted to control the record operation, a second memory for storing said characters, a central unit being responsive to this microprogram for reading the characters in said second memory and a record device for recording said characters onto said magnetic substrate.

Previously known devices for recording items of information onto magnetic substrates e.g., magnetic cards or magnetic tapes, may use the so-called "Frequency Duplication" record system.

This system consists in recording a timing signal at equal intervals, and the information signal after a time period which is approximately half of said interval. More particularly, if the bit to be recorded has a bit which has the value "1" then an information signal is present; conversely, the absence of this information signal denotes that the character has a bit which has a value "0". Systems of such type generally comprise: a shift register for storing an 8-bit character and adapted to allow the reading of one bit at a time to be recorded; a clock for generating signals marking the timing intervals; and, a frequency duplicator adapted to generate a frequency which is twice the clock frequency so as to allow the record of the information bits in the middle of the timing interval.

Such a system has the disadvantage of requiring specialized wiring for the record operation. Another disadvantage consists in the fact that the system timing must be exactly synchronized with the overall timing of the machine in order to avoid recording errors.

Furthermore, such systems are not economically justifiable in a machine of the microprogrammed central unit type, where, as recited below, the circuit functions may be executed by the central unit.

SUMMARY OF THE INVENTION

The present invention describes means whereby all recording operations are handled directly by the central unit.

The technical problem presented is overcome by a system according to the invention which is characterized by a peripheral control unit adapted to decode predetermined microinstructions to control a record device, and a central unit comprising means for cyclically transmitting said predetermined microinstructions to said peripheral control unit at fixed time intervals, a register for storing the bits of each character to be recorded in corresponding cells, means for sequentially sensing said cells substantially in the middle of said timing interval, and means controlled by said sensing means for selectively sending said predetermined microinstructions to said peripheral control unit in coicidence with said bits.

BRIEF DESCRIPTION OF THE DRAWINGS

A description of a preferred embodiment is now made with reference to the accompanying drawings, wherein:

FIG. 2 is a detailed block diagram of a portion of a preferred embodiment of the invention;

DETAILED DESCRIPTION OF PREFERRED EMBODIMENTS

Figure 1:
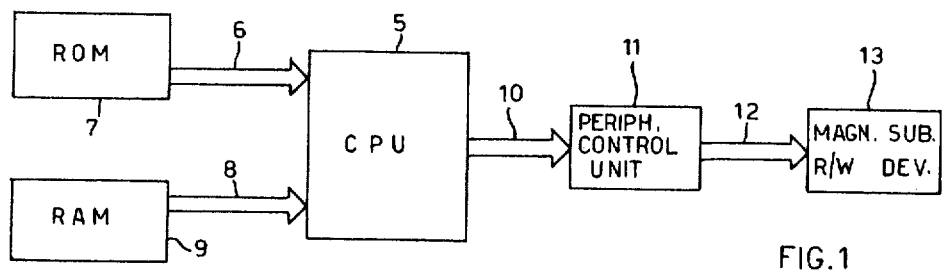
FIG. 1 is a block diagram of a preferred embodiment of the invention.

Referring to FIG. 1, the system according to the invention is applied on a machine comprising a data processing central unit 5, hereinafter defined by the symbol CPU, which is connected to a read-only memory 7 (ROM) by a channel 6, and to a read and write memory 9 (RAM) by a channel 8. The CPU is furthermore connected to a peripheral control unit 11 by which a channel 10, which is in turn connected to a magnetic substrate read and write device 13.

It should be noted that a plurality of peripheral control units and a plurality of peripheral units are always connected to the CPU 5 depending upon the type of application. If, for instance, the CPU 5 is used by an accounting machine, a keyboard, a printer and an automatic front feed facility provided with all related control means, are required in addition to what is disclosed in FIG. 1. All this is not depicted in FIG. 1 as it has no necessary relationship to the present invention.

The peripheral control unit 11 portion relates to the record operation will be more fully described below. The ROM 7 is adapted to store operational microprograms used by the CPU 5 for carrying out the operations required by the object program. The ROM 7 is of any known type, having the characteristic that its contents can be in no way modified by the operator, and may be implemented by means of known MOS technology.

The RAM 9 is also of known type and is adapted to store variable data; it comprises operational registers used for data processing and is implemented by known technology as, for instance, by MOS technology.

The CPU 5 comprises a portion adapted to read the microinstructions in the ROM 7 and in the RAM 9 and to write data into the RAM 9; a portion adapted to carry out arithmetic and logic operations; and a portion adapted to handle the data flow to/from the peripheral units.

In the description hereinbelow, the CPU 5 will not be described fully in detail; but there will be described in detail only the circuits and registers related to the invention.

The circuits related to the selection of the magnetic card peripheral control unit 11 also will not be described, it being assumed that the unit is already connected to the CPU 5 by any known means; a detailed description is provided only of the connection portion referring to the record operation related to the present invention.

With reference to FIG. 2, a more detailed description is now provided of the portion of CPU 5 and of the RAM 9 used in this preferred embodiment of the invention.

In particular, the CPU 5 comprises: a clock 15 adapted to generate impulses at constant time intervals defining the machine cycles; and a control unit 16, hereinafter denoted as CLU, which is conditioned by a register 17 to sequentially and selectively generate the commands K1, K2 ... K16.

The CLU 16 is implemented by known design techniques; it need only be said in particular that it is a logic network having eight input points, and 16 output points corresponding to the commands K1 ... K16; the CLU 16 generates, in response to the combination of bits being applied to the input, the commands associated with such bit combinations. The command sequence is carried out at points of time established by timing impulses.

The instruction register 17 is connected to the ROM 7 and is provided to staticize the eight bits of the microinstruction read from the cell of the ROM 7 identified by the program counter register 18.

As just recited, the register 18 stores the address of the memory ROM 7 cell related to the microinstruction subsequent to the one now in progress; in fact said register is increased by the CLU 16 by one or two units, according to whether the instruction in process is made up of one or two bytes (or 8-bit characters).

Increasing of the register or program counter 18 is executed by commands generated by the CLU 16 in accordance with the input microinstruction.

A channel 20 links the CLU 16 to an accumulator register 21 (identified by ACC in FIG. 4) having an 8-bit capacity; the register 21 is connected to a cell 24 for storing the less significant bit of the accumulator during the execution of a microinstruction causing a one-bit shift of the accumulator 21 contents.

An arithmetic logic unit 22 hereinafter identified by ALU 22 is linked to accumulator 21 and executes all logic and arithmetic operations on the data stored in the accumulator 21 and that stored in special registers of the RAM 9, and is adapted to generate indicative signals concerning the results of special logic operations. In carrying out the comparison and conditioned jump microinstructions, for instance, the ALU 22 generates a signal over the wire 23 which provides the CLU 16 with the comparison result.

It is to be noted that the signal over the wire 23 is controlling the operation of the CLU 16 only in the event the read instruction requires that a condition must exist; otherwise its presence does not affect the CLU 16. For instance, this may be carried out by considering the signal over the wire 23 as applied to a column of the matrix included in the CLU 16, the other columns thereof being represented by the instruction bits.

As already said, the commands K1 ... K16 generated by the CLU 16 handle the execution of the instructions by carrying out data transfers, decrementing and incrementing of registers, etc. For instance, consider a microinstruction requiring that the register 30 of the RAM 9 is to be decreased by one. The elemental steps controlled by the CLU 16 are: reading of the ROM 7 cell being addressed by the counter 18, transfer of the read contents into the instruction register 17, instruction recognition by the CLU 16, generation by the CLU 16 of the commands related to the operations required by the instructions. In particular, the CLU 16 increases the counter 18 by one, reads the second instruction byte, transfers the contents of the RAM 9 cell being addressed by the second byte into a register of the ALU 22, causes the ALU 22 to increase the contents of such register and newly transfers the so increased register contents into the same RAM 9 cell.

These operations are represented by the generation of a command K1 through the CLU 16 for increasing the counter 18 and of a command K12 for decreasing the register 30 by one. The other instructions are similarly utilized.

In FIG. 2 are shown the RAM 9 zones and registers used by the systems of this invention; additionally there is shown therein the connections of the zones to accumulator register 21 and ALU 22; in effect, all such connections are made up of a RAM 9 input/output buffer not depicted in the figure.

The instruction register 17 is furthermore connected to a decoder 41 through a channel 40 (FIG. 3), the decoder being adapted to generate an output signal MK01 N when the connection instruction is present in the register 17, this instruction being generated by the CPU 5 when connection to the peripheral control unit is required.

As the connection procedure between the peripheral control unit 11 and the CPU 5 is no part of the present invention, its description is omitted; for the sake of this example, it is assumed that the signal MK01 N is already at level one.

The signal MK01 energizes the SET input of the flip-flop 42 which provides the signal ABIRO on its output 43.

The decoder 41 is furthermore adapted to generate the signal MC01 N at its output 45 when a special microinstruction called 10X is present in the register 17. The output 45 is linked to a flip-flop 47 which changes over the outputs 48 and 49 at every impulse MK01 N present at its input when the signal ABIRO is at level one.

The outputs 48 and 49 are connected to two AND circuits 50 and 51 respectively, which are likewise conditioned by the signal ABIRO. The outputs 52 and 53 of the AND circuits 50 and 51 are connected to the record coils 55 and 56, respectively, of the magnetic record device 13. In particular, if the output 52 is energized, the magnetization will have a certain polarity, while if the output 53 is energized the output 53 the magnetization will have the opposite polarity. The operation of the system according to the invention is now described with reference to the FIGS. 2, 3, 4 and 5. TABLE A, below, lists all pertinent microinstructions that are stored in the ROM 7. Listed in the first column is the symbolic denomination of some addresses; in the second column are the numbers corresponding to the microinstruction addresses specified on a hexadecimal basis; in the third column are the operative codes of the microinstructions; in the fourth column are the microinstruction operands, in the fifth column are the commands generated by the CLU 16 according to the microinstruction operation operands and in the sixth column is a brief comment related to the functions executed by the microinstructions.

CARD ROUTINE RECORD

| (TAB A) Symbolic Name | Address | Operation Codes | Operands | Commands of CLU 16 | Comment |
|---|---|---|---|---|---|
| SURECA | 6ADA | LACIM | X"07" | K2 | ACC "07" |

-continued

CARD ROUTINE RECORD (TAB A)

| Symbolic Name | Address | Operation Codes | Operands | Commands of CLU 16 | Comment |
|---|---|---|---|---|---|
| | 6ADC | DAC | CONT | K3 | CONT ACC |
| | 6ADE | LAC I | AP2 | K4 | ACC (AP2) |
| | 6AEO | DAC | AP3 | K5 | AP3 ACC |
| RECLOK | 6AE2 | IOX | B"00" | K6 | IOX REGIS.CLOCK |
| | 6AE3 | LACIM | X"F8" | K2 | ACC "F8" |
| | 6AE5 | IAC | | K9 | ACC ACC+1 |
| | 6AE6 | SZA | | K7(K8) | IF ACC="00", Jump |
| | 6AE7 | JMPIM | *−2 | | Jump A 6AE5 |
| | 6AE9 | LAC | AP3 | K10 | ACC AP3 |
| | 6AEB | LRR | | K11 | STEP ACC |
| | 6AEC | DAC | AP3 | K5 | AP3 ACC |
| | 6AEE | LACIM | X"00" | K2 | ACC "00" |
| | 6AFO | SNL | | | IF (24)="1",Jump |
| | 6AF1 | JMPIM | TEMPO1 | | CALL TEMPO1 |
| | 6AF3 | IOX | B"00" | K6 | IOX REGIS.BIT |
| | 6AF4 | JMPIM | TEMPO2 | | CALL TEMPO2 |
| TEMP02 | 6AF6 | DEM | CONT | K12,K13, (K8) | CONT CONT−1 |
| | | | | | IF CONT=FF,Jump |
| | 6AF8 | JMPIM | TEMPO3 | | CALL TEMPO3 |
| | 6AFA | DEM | BYTE2 | K14,K15, (K8) | BYTE2 BYTE2−1 |
| | | | | | IF BYTE2=FF, Jump |
| | 6AFC | JMPIM | *+3 | | JUMP A 6AFF |
| | 6AFE | RET | | | END REGISTRAZ. |
| | 6AFF | INC | AP2 | K16 | AP2 AP2+1 |
| | 6B01 | JMPIM | TEMPO4 | | CALL TEMPO4 |
| TEMPO6 | 6B03 | LACIM | X"FD" | | 35 MICROSEC. |
| | 6B05 | IAC | | | |
| | 6B06 | SZA | | | |
| | 6B07 | JMPIM | *−2 | | |
| | 6B09 | SWOP | | | |
| | 6B0B | SWOP | | | |
| | 6B0C | JMPIM | SURECA | | |
| TEMPO3 | 6B0E | LACIM | X"F8" | | 95 MICROSEC. |
| | 6B11 | IAC | | | |
| | 6B12 | SZA | | | |
| | 6B13 | JMPIM | *−2 | | |
| | 6B14 | NOP | | | |
| | 6B15 | JMPIM | *+2 | | |
| | 6B17 | JMPIM | *+2 | | |
| | 6B19 | JMPIM | RECLOK | | |
| TEMPO4 | 6B1B | NOP | | | |
| | 6B1D | JMPIM | TEMPO6 | | |
| TEMPO1 | 6B1F | NOP | | | |
| | 6B1E | JMPIM | TEMPO2 | | |

In explaining the operations, it is assumed that the equipment is executing a program including an instruction which requires the data stored in a prefixed field of the RAM 9 is to be recorded on the magnetic card.

The same instruction calling for recording the data record, also recalls a microinstruction IOX which is sent to the decoder 41 of the peripheral control unit 11, which thus generates the signal MK01 N; the flipflop 42 is energized and provides the signal ABIRO over the wire 43.

The microinstruction IOX interconnects the CPU 5 with the peripheral control unit 11.

The field to be stored is specified in a known manner by the abovementioned instruction which stores the address of the RAM 9 cell containing the first (8-bit) character to be recorded into two byte areas of a register 60 of the RAM 9 (identified by AP 2 in the Table A), and the number of the characters corresponding to the length of the field to be stored into a register 62 identified in the Table A by BYTRE2.

The maximum length of the memory field to be stored depends upon the number of bits stored in the register 62 which is, in the present example, equal to eight bits, thus allowing the handling of a maximum of 256 characters; it is apparent that if the register 62 were able to store two bytes, the maximum field length would be equal to 256 × 256 bytes.

At this point in time the program counter 18 stores the address of the first microinstruction related to the record operation microprogram. This status is displayed in FIG. 4 by the block 100. QWhen the CLU 16 recognizes this microinstruction, it generates the command K1 that increases the counter 18 by one; this command is generated each time a microinstruction is recognized.

Figure 4:
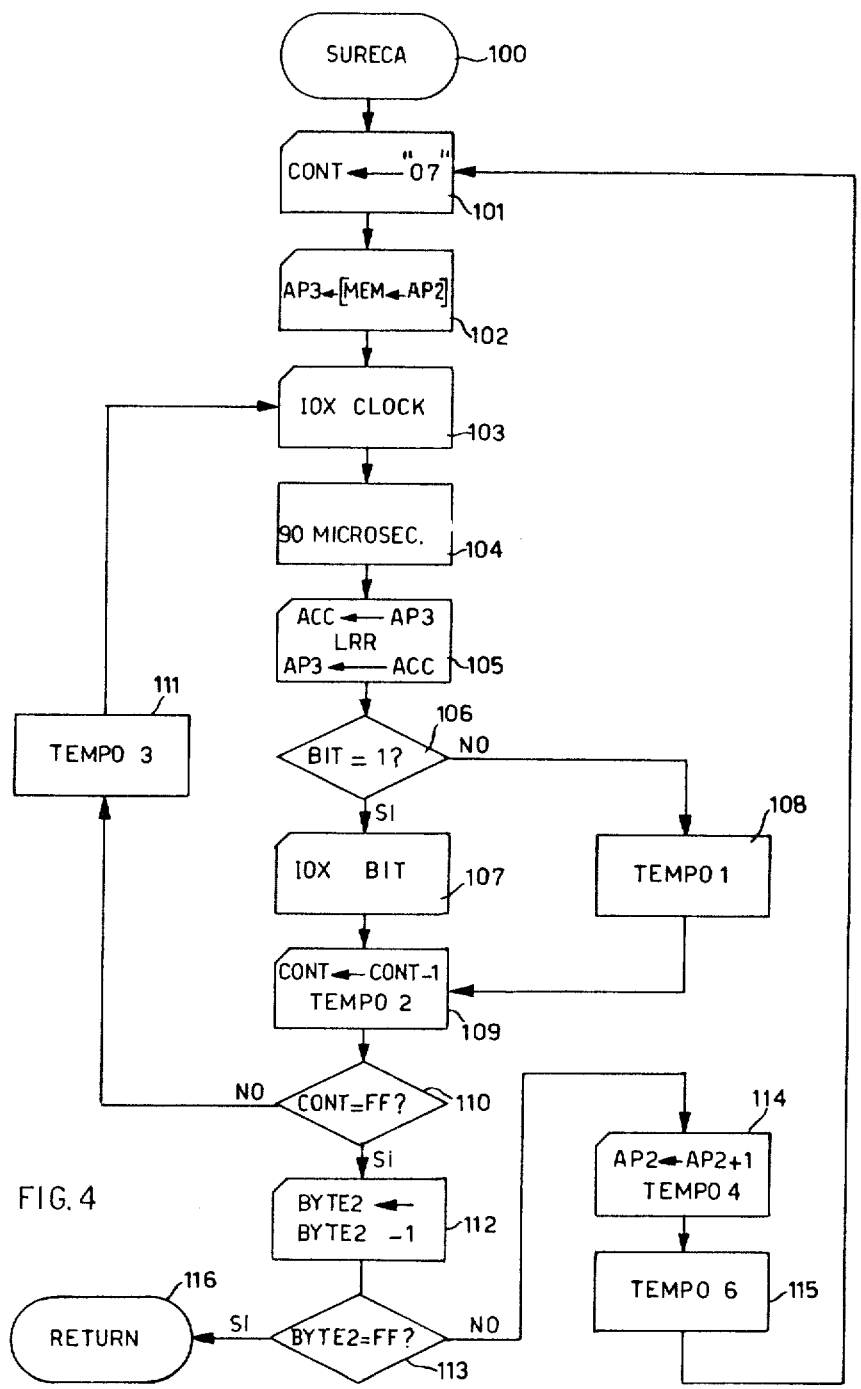
FIG. 4 is a flow chart of the operation sequence carried out by the inventive system.

As a result the subsequent microinstruction LACIM is read and transferred to the register 17, causing the CLU 16 to generate the command K2 which loads the datum "07" into the accumulator 21 as defined by ACC in the Table A. The subsequent microinstruction DAC calls for the command K3 which transfers the contents of the accumulator 21 to the register 30: this operation is shown in FIG. 4 by the block 101.

The subsequent microinstruction, namely LAC I, gives rise to the command K4 which transfers the contents of the memory cell addressed by the register 60 of the accumulator 21. Thereafter follows the microinstruction DAC which transfers the contents of the accumulator 21 to the register 70 of the RAM 9 (AP 3 in the Table A), denoted by the operand of the same microinstruction. This operation is displayed in FIG. 4 by the block 102 and is originated by the command K5 (FIG. 2).

At this point in time the register 70 stores the first character of the memory zone to be recorded, and the register 30 stores the binary information 00000111.

The subsequent microinstruction IOX causes the CLU 16 to generate the command K6 which transfers the contents of the register 17 to the decoder 41. The latter generates the signal MC01 N over the wire 45 thus changing over the flip-flop 47 which was already enabled by the signal MK01 N. In this way the direction of the magnetization current in the magnetization device 13 is reversed in coincidence with the IOX command (FIG. 5); this current reversal represents the timing signal relative to the first information bit to be recorded. This operation is shown in FIG. 4 by the block 103.

Subsequently four microinstructions LACIM, IAC, SZA, JMPIM are executed, the object whereof is to allow a 90 microsecond time interval to elapse starting from the timing signal.

In particular, this idle time is obtained by loading the binary number 11111000 (LACIM) into the accumulator 21, by increasing such number (IAC) by one through the signal K9 and by comparing each time whether such contents are 00000000 (SZA).

The cycle IAC, SZA is repeated eight times incidental to the microinstruction JMPIM, namely as many times as necessary to obtain the 00000000 accumulator condition. This condition is checked by the ALU 22 in coincidence with the command K7 generated by the CLU 16 owing to the microinstruction SZA.

When this condition occurs a signal is applied to the wire 23 which, being combined with the eight bits related to the microinstruction SZA, causes the CLU 16 to generate the command K8 which increases the program counter 18 by two units; the microinstruction JMPIM is thus skipped, avoiding the idle time displayed in FIG. 4 by the block 104.

At this point there is executed the microinstruction LAC which, by the medium of the command K10, transfers the contents of the register 70 to the accumulator 21.

Subsequently the microinstruction LRR is decoded causing the CLU 16 to generate the command K 11 which shifts the contents of the accumulator 21. This transfers the first bit to be recorded to the cell 24, and the contents of the latter are transferred to the place of the most significant bit of the accumulator 21.

After this, the previously modified contents of the accumulator is transferred to the register 70 by the microinstruction DAC. These operations are displayed in FIG. 4 by the block 105.

It is to be noted that the second bit to be recorded is now stored in the less significant position of the register 70.

The subsequent microinstruction LACIM loads the bit configuration 00000000 into the accumulator 21; the only purpose of this is to perform an established number of idle machine cycles so as to reach the bit record microinstruction (subsequent IOX) adter exactly 119 microseconds starting from the timing microinstruction previously provided.

The subsequent microinstruction SNL coinciding with the level 1 signal existing on the wire 75 corresponding to the first bit to be recorded, causes the CLU 16 to generate the command K8, which, as seen above, increases the program counter 18 by two units. In this way the CLU 16 executes a microinstruction IOX which, as seen above, changes the current over in the record device 13 (block 107). If the information bit had a level 0 (logic branch 106), no signal was existing on the wire 75 wherefore the command K8 was not generated and therefore the program counter 18 was increased by one unit only. Consequently the CLU 16 would have executed a jump instruction JMPIM to the address TEMPO1 identified by the operand. Stored at this address is a microinstruction NOP which causes 3 idle microseconds to elapse, and, consequently, the execution of a jump instruction JMPIM to the address TEMPO2 would be, as displayed in Table A, successive to the address of the microinstruction IOX.

The addition of the times required for executing the two microinstructions JMPIM and the microinstruction NOP (Block 108) is naturally equal to the time required for executing the microinstruction IOX; thus the address TEMPO 2 is reached 124 microseconds after the generation of the microinstruction IOX related to the first timing signal. The microinstruction stored at the address TEMPO 2, namely DEM, causes the CLU 16 to generate the command K 12 which decreases the contents of the register 30 by one unit (said register was previously loaded with the binary number 00000111).

This operation is shown by the block 109 of FIG. 4 Subsequently, the same microinstruction DEM generates the command K 13 which transfers the contents of the register 30 to the ALU 22 which compares the received binary number with the number 11111111 (identified on the logic branch 110 of the FIG. 4 by the hexadecimal notation FF).

As the contents of the register 30 are now 00000110, the ALU 22 does not generate a signal on the wire 23; thus the CLU 16 does not generate the command K 8; consequently the routine TEMPO 3 is recalled (block 111 in FIG. 4) which executes a certain number of idle cycles lasting a total of 95 microseconds as displayed in the Table A, and having as the last instruction a jump (JMPIM) toi the address RECLOK corresponding to the generation of a new timing signal.

It is to be noted that the time elapsed between the sending of the information bit and the sending of the second timing signal equals 119 microseconds. In fact starting from the bit record microinstruction IOC there are executed:

| | |
|---|---|
| - JMPIM to TEMPO 2 | 5 microseconds |
| - DEM | 14 microseconds |
| - JMPIM to TEMPO 3 | 5 microseconds |
| - TEMPO 3 | 95 microseconds |
| Total | 119 microseconds |

Figure 3:
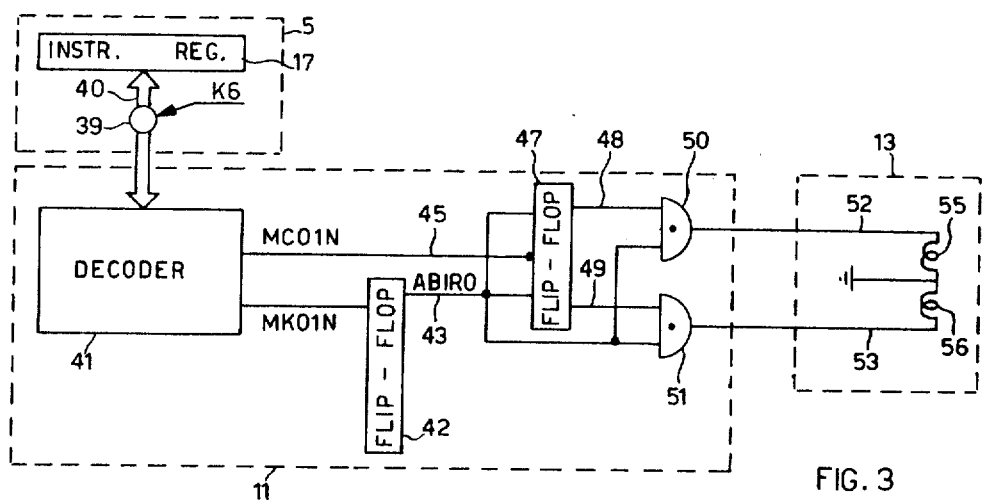
FIG. 3 is a detailed block diagram of the peripheral control unit portion utilized in the record operation.

At this point of time a new IOX is sent, resulting in a return to the block 103 of the FIG. 4 which, as said above, causes the current to change over in the record device 13 (FIG. 3). The cycle (FIG. 4) starting from the block 103 and going through the blocks 110 and 111, is repeated eight times, nemely as many as the register 30 requires for storing 11111111.

It should be noted that this cycle provides the automatic shifting operation of the bits referring to the character stored in the register 70 of the RAM 9, thus allowing the elimination of a suitable shift register in the peripheral control unit 11 for sending an information bit sequence to the recorrd device 13.

When the register 30 stores 11111111, the microinstruction DEM causes the ALU 22 to generate a signal on the wire 23, which causes the CLU 16 to produce the command K 8. As seen above, the latter increases the program counter 18 by two units, whereby the jump to the routine TEMPO 3 is not carried out. The microinstruction DEM is read instead causing the CLU 16 to generate the command K 14 to decrease the register 62 by one unit; as already said, the register 62 stores the number of characters to be recorded.

Subsequently the microinstruction DEM causes the CLU 16 to generate the command K 15 which causes the ALU 22 to apply a signal over the wire 23 in the event the contents of the register 62, and is 11111111, or to fail to apply it in the event the contents is other than 11111111 whereby the program counter 18 is increased by one unit and there is executed the microinstruction JMPIM which produces the jump to the microinstruction INC.

The latter generates the command K16 by the medium of the CLU 16, which increases the register 60 by one. In this way there is addressed the second chaacter of the RAM 9 zone to be recorded (block 114 in the FIG. 4).

As disclosed above, the contents of the register 60 are used by the microinstructions defined by the block 102 for reading the second character to be recorded.

The subsequent microinstruction JMPIM executes a jump to the address TEMPO4, which recalls the routine TEMPO6 (block 115). The order function of TEMPO6 is to let the 35 microseconds elapse idly which are required for returning to the initial program instruction (LACIM), so as to reach the block 103 (sending of the timing IOX) exactly 238 microseconds starting from the timing instruction IOX that was previously provided.

The cycle of the FIG. 4 that comprises the blocks from 101 to 113, 114 and 115, is repeated as many times as there are characters of the RAM 9 to be recorded, which are identified by the register 62.

In fact, if the microinstruction DEM (logic branch 113 in FIG. 4) recognizes, by means of the ALU 22, that the contents of the register 62 are equal to 11111111, a signal is generated on the wire 23 which causes the CLU 16 to generate the command K8 which increases the program counter 108 by two units.

Figure 5:
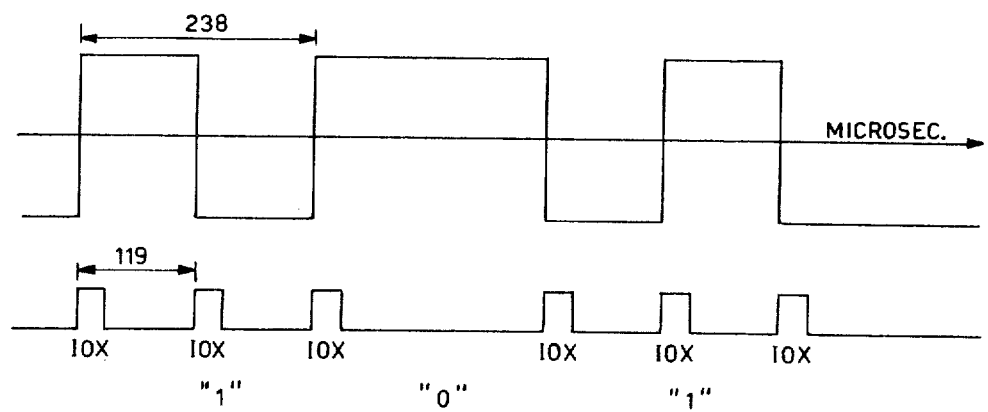
FIG. 5 shows a diagram of the magnetization current.

In this way the microinstruction RET is executed that denotes the end of the record operation (block 116). An example of the recording of the bits and the magnetic tape is shown in FIG. 5 in which it is noted that the variations of the magnetization of the tape occurs in correspondence of each microinstruction IOX.

At this point of time the interrupted processing of the object program instruction that required the record operation is resumed in the known manner; namely the subsequent program instruction is read.

It is intended that changes or additions of parts may be made to the system according to the invention without departing from the scope of the invention. For instance, it is possible to modify the time interval between two consecutive timing signals by modifying the duration of the idle time routines such as TEMPO 3, TEMPO 4, TEMPO 6. Furthermore, there may be changed the bits building up each character, by modifying the datum being stored in the register 30.

Other changes may ocur to one skilled in the art without departing from the spirit of the invention described herein whose scope is only to be defined by the appended claims.

We claim:

1. System for recording an information character onto a magnetic substrate comprising a first memory for storing a microprogram adapted to control said record operation, a second memory for storing said character, a central unit conditioned by said microprogram for reading said character out of said second memory, and a record device for recording said character onto said magnetic substrate, wherein a peripheral control unit responsive to predetermined decoded microinstructions provided by said central unit for providing corresponding record signals to said record device, said central unit comprising means for cyclically transmitting said predetermined microinstructions to said peripheral control unit at fixed time intervals, a register for storing in corresponding cells the bits of the character to be recorded, means for sequentially sensing each of said cells substantially in the middle of said fixed time intervals and means controlled by said sensing means for selectively sending said predetermined microinstructions to said peripheral control unit in coincidence with sending said bits to said record device.

2. System as in 1 wherin said central unit comprises a second register for storing one at the time the microinstructions of said microprogram read from said first memory, a transmission channel connecting said second register to said peripheral control unit, a decoder unit means for decoding said microinstructions and for generating commands associated with said microinstructions and execution means controlled by said commands for executing the processing operations associated with said microinstructions, each microinstruction being executed in a predetermined time interval, said first memory storing a microinstruction set between said predetermined microinstructions, said execution means executing the microinstructions of said set in a time interval equal to said foced time interval, and said decode unit enabling said channel in coincidence with said predetermined microinstructions.

3. System as in claim 2, wherein said sensing means of said control unit comprise a further cell connected to said first register, said decode unit being conditioned by a further microinstruction of said microinstruction set for generating a command adapted to transfer the less significant bit of said first register into said further cell, said execution means executing the microinstructions comprised between one of said predetermined microinstructions and said further microinstruction in a time interval substantially equal to the time between the start and the middle of said time interval.

4. System according to claim 3, wherein said further cell conditions said control unit to enable said transmission channel in coincidence with transmission of one of the two possible binary values of said less significant bit.

5. System according to claim 1, wherein said peripheral control unit comprises a decoder adapted to decode said predetermined microinstructions generating a signal corresponding thereto, output lines connected to said record device, and a bi-stable element adapted to control the output line to carry an indication of said corresponding signal record device.

6. System according to claim 5, wherein said second memory comprises a third register for storing a number representing the number of bits of each of said characters to be recorded, said decode unit of said peripheral control unit decreasing said third register by one unit after the activation of said sensing means.

7. System according to claim 6, wherein said second memory comprises a fourth register for storing the address of the first character to be recorded, and a fifth register for storing the number of characters to be recorded, and said peripheral control unit including control means for generating a command signal for increasing said fourth register by one unit and for contemporaneously decreasing the contents of said fifth register by one unit, in response to a change in the contents of said third register to a predetermined value.

8. System according to claim 7, wherein said control means are energized by said peripheral control unit decode unit in coincidence with a microinstruction for comparing the contents of said third register with said first predetermined value, said decode unit causing said control means to generate said command signal.

9. System according to claim 8, wherein said control means are adapted to compare the contents of said fifth register with a second predetermined value for generating an end-of-record signal.

\* \* \* \* \*